United States Patent [19]

Davenport et al.

[11] Patent Number: 5,367,590

[45] Date of Patent: Nov. 22, 1994

[54] OPTICAL COUPLING ASSEMBLY FOR USE WITH A HIGH BRIGHTNESS LIGHT SOURCE

[75] Inventors: John M. Davenport, Lyndhurst; Richard L. Hansler, Pepper Pike, both of Ohio

[73] Assignee: General Electric Company, Schenectady, N.Y.

[21] Appl. No.: 193,626

[22] Filed: Feb. 8, 1994

Related U.S. Application Data

[63] Continuation of Ser. No. 859,180, Mar. 27, 1992, abandoned.

[51] Int. Cl.$^5$ ............................................. G02B 6/26
[52] U.S. Cl. ........................................ 385/39; 385/47; 385/88; 385/89; 385/92; 385/901; 385/900; 385/42
[58] Field of Search ................ 385/39, 42, 43, 47, 385/50, 88, 89, 92, 121, 901, 900

[56] References Cited

U.S. PATENT DOCUMENTS

| Re. 33,722 | 10/1991 | Scifres et al. | 385/33 |
|---|---|---|---|
| 3,204,326 | 9/1965 | Granitsas | 385/115 |
| 3,832,028 | 8/1974 | Kapron | 350/96 |
| 3,901,581 | 8/1975 | Thiel | 350/96 |
| 4,002,499 | 1/1977 | Winston | 136/206 |
| 4,089,583 | 5/1978 | Auracher et al. | 350/96.15 |
| 4,516,828 | 5/1985 | Steele | 350/96.16 |
| 4,534,615 | 8/1985 | Iwasaki et al. | 385/121 |
| 4,682,849 | 7/1987 | Kowata et al. | 385/39 |
| 4,720,161 | 1/1988 | Malavieille | 385/50 X |
| 4,744,615 | 5/1988 | Fan et al. | 350/96.10 |
| 4,784,877 | 11/1988 | Trumble | 427/163 |
| 4,807,963 | 2/1989 | Iwasaki | 350/96.24 |
| 4,958,263 | 9/1990 | Davenport et al. | 362/32 |
| 5,058,985 | 10/1991 | Davenport et al. | 385/115 |
| 5,059,013 | 10/1991 | Jain | 359/503 |
| 5,222,180 | 6/1993 | Kuder et al. | 385/115 |

Primary Examiner—Rodney B. Bovernick
Assistant Examiner—Hemang Sanghari
Attorney, Agent, or Firm—George E. Hawranko; Stanley C. Corwin

[57] ABSTRACT

An optical coupling assembly is useful for coupling a source of light, having high brightness and focussed at a focal plane, to a plurality of optical light conductors. The coupling assembly includes a light transmissive elongated segmented rod-shaped coupling member formed of a plurality of longitudinal sections and a retainer member for holding the longitudinal sections together in an assembled relationship. The coupling member has a central longitudinal axis and at an input end is disposed at the focal plane of the light source, while at an output end is disposed against leading ends of the plurality of optical light conductors. Each longitudinal section of the coupling member has a plurality of spaced longitudinal surfaces capable of internally reflecting light traveling within the longitudinal section. The retainer member is a hollow sleeve which holds the longitudinal sections together in the nested relationship with one another such that some of the longitudinal surfaces of the longitudinal sections define an external circumferential surface of the coupling member whereas others of the longitudinal surfaces of the longitudinal sections define a plurality of internal surfaces within the coupling member which extend from the external circumferential surface to the central longitudinal axis thereof.

5 Claims, 2 Drawing Sheets

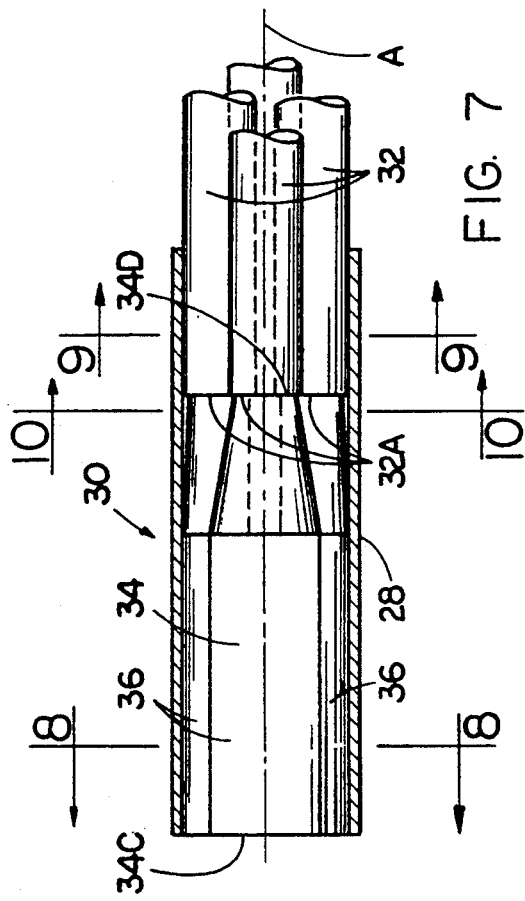
FIG. 7
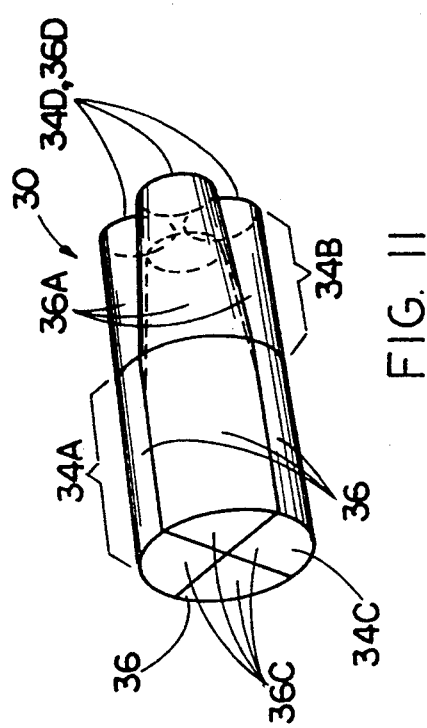
FIG. 11
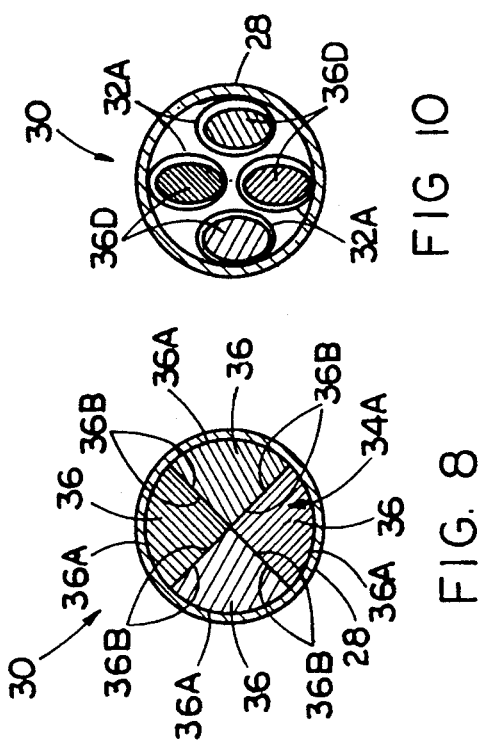
FIG. 8
FIG. 10
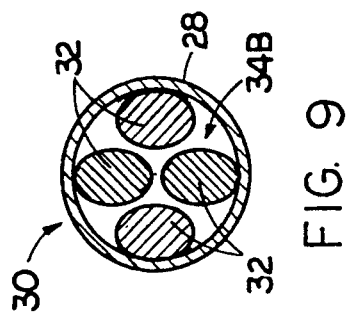
FIG. 9

OPTICAL COUPLING ASSEMBLY FOR USE WITH A HIGH BRIGHTNESS LIGHT SOURCE

This application is a continuation of application Ser. No. 07/859,180, filed Mar. 27, 1992 now abandoned.

CROSS-REFERENCE TO RELATED APPLICATIONS

Reference is hereby made to the following copending U.S. patent applications dealing with related subject matter and assigned to the assignee of the present invention:

1. "Coupler Apparatus For Use With A High Brightness Light Source" by John M. Davenport et al, assigned U.S. Ser. No. 07/854,186 and filed Mar. 27, 1992, now U.S. Pat. No. 5,259,056.
2. "High Brightness Discharge Light Source" by Gary Allen et al, assigned U.S. Ser. No. 07/858,906 and filed Mar. 27, 1992, now U.S. Pat. No. 5,239,230.
3. "Reverse Flared Optical Coupling Member For Use With A High Brightness Light Source" by John M. Davenport et al, assigned U.S. Ser. No. 07/859,176 and filed Mar. 27, 1992.
4. "Polygonal-Shaped Optical Coupling Member For Use With A High Brightness Light Source" by John M. Davenport et al, assigned U.S. Ser. No. 07/859,179 and filed Mar. 27, 1992.

BACKGROUND OF THE INVENTION

1. Field of the Invention

The present invention relates generally to optical coupling of a high brightness light source to a plurality of optical light conductors and, more particularly, to an optical coupling assembly providing an increased number of internal reflections and thereby improved light color mixing.

2. Description of the Prior Art

Central lighting systems wherein a single light source is used to supply light output to a number of spaced apart locations using a plurality of optical light conductors, such as optical tubes, rods or fibers, have been proposed for a number of different applications including automotive, display and home lighting. For instance, U.S. Pat. No. 4,958,263 issued to Davenport et al and assigned to the same assignee as the present invention discloses the use of a central lighting system for an automotive application.

The light source for such a central lighting system must be capable of providing a light output having high brightness characteristics so as to ensure sufficient light output at the spaced apart locations. One suitable light source having a high brightness characteristic measuring in excess of 50,000 lumens per square centimeter is disclosed in the second patent application cross-referenced above. Such a light source when used in conjunction with a suitable reflector, such as one having an ellipsoidal shape, and a mirror element to focus the light output on the ends of optical fibers disposed at an optical focal plane of the reflector can produce a non-coherent high brightness focussed light output capable of causing physical damage to the ends of the optical fibers. To avoid the possible damage to the ends of the optical fibers, a light guide in the form of an one-piece optical cylindrical coupler rod, preferably about 1½ inches in length and ¾ inch in diameter, is interposed between the optical focal point and the ends of the optical fibers. The light output travels through multiple internal reflections from the optical focal point to the optical fibers.

Also, the non-coherent high brightness light output image produced by the light source and focussed by the ellipsoidal reflector tends to be brightest and more blue in color at the center of the light output and dimmer and more red in color around the outer edge of the light output. When the light output enters the optical cylindrical coupler rod, the multiple internal reflections tend to achieve some mixing of the light and thereby reducing the differences in color from the outer edge to the center of the light output entering the optical fibers.

In order to achieve adequate light mixing, some minimum length to diameter ratio is needed for the coupler rod. The inventors herein have found that a length of 1½ inches for a coupler rod of ¾ inch diameter, or a ratio of 2, is not adequate to produce sufficient light mixing to substantially reduce the color differences. A cylindrical coupler rod of sufficient length to provide adequate light mixing would be too long for the central lighting system in the automotive lighting application. Therefore, a need remains for improvement of the design of optical coupling rods so as to increase light mixing without increasing substantially the length of the rod.

SUMMARY OF THE INVENTION

The present invention provides an optical coupling assembly designed to satisfy the aforementioned needs. The optical coupling assembly of the present invention employs a segmented coupling member which has multiple internal reflective surfaces providing an increased number of internal reflections per unit of axial length, over that provided by a prior art one-piece cylindrical coupling member, without increase of the axial length of the coupling member.

Accordingly, the present invention is directed to an optical coupling assembly for use in coupling non-coherent light from a source focussed at a focal plane to a plurality of optical light conductors. The coupling assembly comprises: (a) a light transmissive rod-shaped coupling member having a central longitudinal axis and being disposed between the focal point of the light source and leading ends of the plurality of optical light conductors, the coupling member being formed by a plurality of longitudinal sections each having a plurality of longitudinal surfaces capable of internally reflecting light traveling within the given section and capable of being assembled together with one another in a nested relationship to form the coupling member; and (b) means for retaining the longitudinal sections assembled together with one another in the nested relationship such that some of the longitudinal surfaces of the longitudinal sections define an external circumferential surface of the coupling member whereas others of the longitudinal surfaces of the longitudinal sections define a plurality of internal surfaces within the coupling member which extend from the external circumferential surface to the central longitudinal axis thereof.

More particularly, the longitudinal sections of the coupling member has pairs of opposite end surfaces which together define flat opposite end faces on the coupling member extending generally perpendicular to the central longitudinal axis thereof. Also, the longitudinal sections are substantially identical to one another. One embodiment of the coupling member is made up of four identical longitudinal sections with each constituting approximately one-fourth of the coupling member.

Another embodiment of the coupling member is made up of five identical longitudinal sections with each constituting approximately one-fifth of the coupling member.

Further, the retaining means is a hollow sleeve-shaped member capable of receiving and retaining the longitudinal sections in the nested relationship with one another and capable of receiving and retaining the leading ends of the light conductors in contact with the end surfaces of the longitudinal sections defining one of the end faces of the coupling member. Also, the longitudinal sections in the nested relationship with one another extend generally parallel to one another and to the central longitudinal axis of the coupling member.

The longitudinal surfaces of the longitudinal sections defining the external circumferential surface of the coupling member are of curved shapes and located at outer peripheries of the longitudinal sections so as to define the external circumferential surface of the coupling member in a cylindrical shape. The longitudinal surfaces of the longitudinal sections defining a plurality of adjacent pairs of internal surfaces within the coupling member are of planar shapes and located at opposite sides of the longitudinal sections so as to extend from the external cylindrical circumferential surface to the central longitudinal axis of the coupling member.

In a modified embodiment, the segmented coupling member has forward and rearward portions wherein the longitudinal sections at the forward portion are disposed in the nested relationship with one another whereas at the rearward portion diverge from the nested relationship with one another into a relationship in which the longitudinal sections are spaced circumferentially from one another and radially from the central longitudinal axis. The longitudinal sections at the rearward portion of the coupling member gradually change in cross-sectional shape.

These and other features and advantages and attainments of the present invention will become apparent to those skilled in the art upon a reading of the following detailed description, when taken in conjunction with the drawings, wherein there is shown and described an illustrative embodiment of the invention.

BRIEF DESCRIPTION OF THE DRAWINGS

In the following detailed description, wherein like reference characters designate like or corresponding parts throughout the several views, reference will be made to the attached drawings in which:

FIG. 7 is a longitudinal elevational view partly in section of another embodiment of an optical coupling assembly of the present invention optically interfaced with a plurality of optical light conductors being oval-shaped in cross-section.

FIG. 8 is a cross-sectional view of a forward portion of the segmented coupling member of the optical coupling assembly taken along line 8—8 of FIG. 7.

FIG. 9 is a cross-sectional view of the plurality of optical light conductors taken along line 9—9 of FIG. 7.

FIG. 10 is a cross-sectional view of a rearward portion of the segmented coupling member of the optical coupling assembly taken along line 10—10 of FIG. 7.

FIG. 11 is a perspective view of the segmented coupling member of the optical coupling assembly of FIG. 7 by itself.

DETAILED DESCRIPTION OF THE INVENTION

Figure 1:
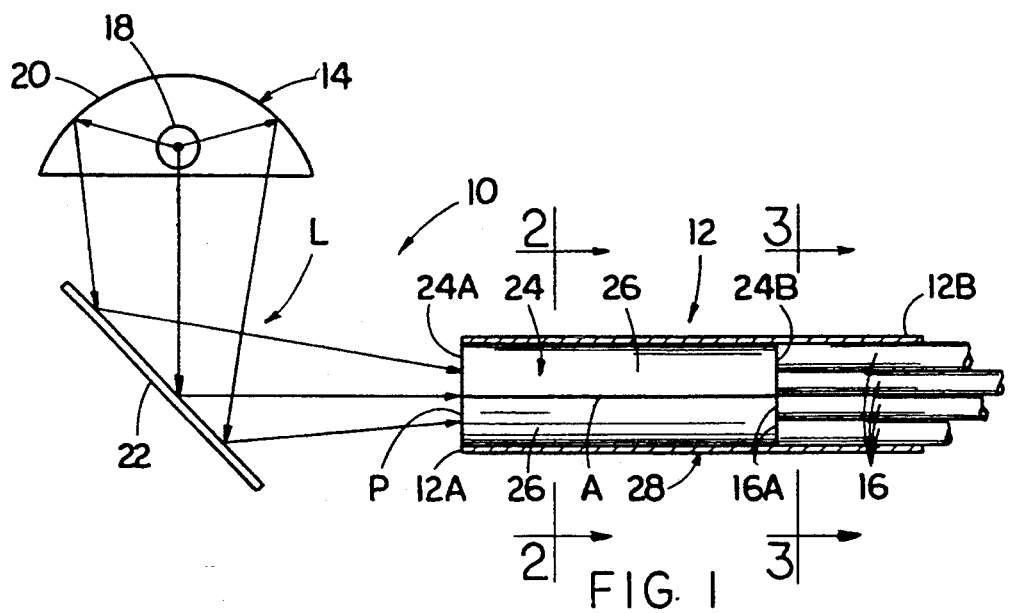
FIG. 1 is a longitudinal elevational view partly in section of a preferred embodiment of an optical coupling assembly of the present invention optically coupling a high brightness focussed light source to a plurality of optical light conductors.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Figure 2:
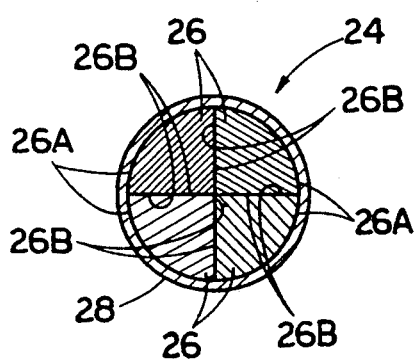
FIG. 2 is an enlarged cross-sectional view of a segmented rod-shaped coupling member of the optical coupling assembly taken along line 2—2 of FIG. 1.
Figure 3:
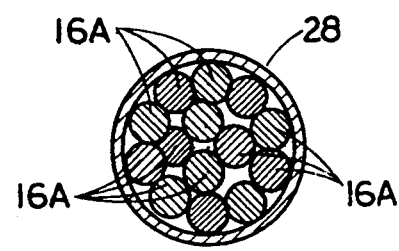
FIG. 3 is an enlarged cross-sectional view of the plurality of optical light conductors taken along line 3—3 of FIG. 1.

Referring now to the drawings, and particularly to FIGS. 1-3, there is illustrated an optical lighting system, generally designated 10, which includes an optical coupling assembly 12 of the present invention interfacing or coupling a source of light 14 with leading ends 16A of a plurality of optical light conductors 16 of the lighting system 10. Preferably, although not necessarily, the source of light 14 includes a lamp 18 capable of generating a non-coherent high brightness light output L, a reflector element 20, such as one having an ellipsoidal shape, and a mirror element 22, such as one having a planar shape, which together are operable to generate, and arranged to focus, an image of the non-coherent high brightness light output L at an optical focal plane P located at an input end 12A of the optical coupling assembly 12. The term "high brightness" refers to any light source with an output of approximately 50,000 lumens per square centimeter effective brightness, however, the subject invention is not limited to a high brightness light source and is equally applicable to any brightness light source. A suitable light source 14 which can be employed in the lighting system 10 is the one disclosed in issued U.S. Pat. No. 5,239,230, the disclosure of which is incorporated herein by reference thereto.

Referring to FIGS. 1-6, the optical coupling assembly 12 of the present invention basically includes an elongated segmented rod-shaped coupling member 24 constructed of a suitable light transmissive material such as quartz or a suitable plastic, and formed of a plurality of longitudinal segments or sections 26, and a retaining means 28 for holding the longitudinal sections 26 together to form the segmented rod-shaped coupling member 24. Preferably, the segmented coupling member 24 is disposed between the focal plane P of the light source 14 and the leading ends 16A of the optical light conductors 16. Also, the segmented coupling member 24 has a central longitudinal axis A and a pair of opposite end faces 24A, 24B. The one end face 24A of the coupling member 24 is preferably disposed at the focal plane P of the light source 14 for receiving the image of the non-coherent high brightness focussed light output L and the opposite end face 24B of the coupling member 24 is disposed in facing contact with the leading ends 16A of the optical light conductors 16 for guiding the light output L into the light conductors 16.

Figure 5:
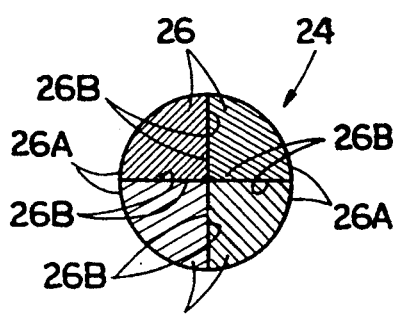
FIG. 5 is a cross-sectional view of the segmented coupling member taken along line 5—5 of FIG. 4.
Figure 4:
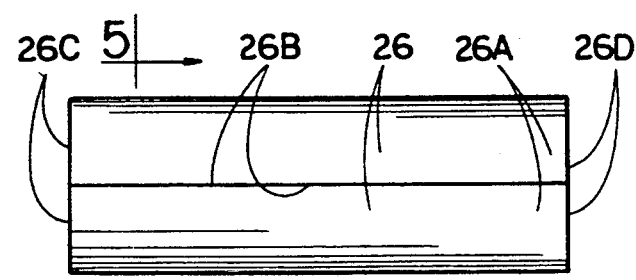
FIG. 4 is an enlarged longitudinal elevational view of the segmented coupling member of the optical coupling assembly of FIG. 1 by itself.
Figure 6:
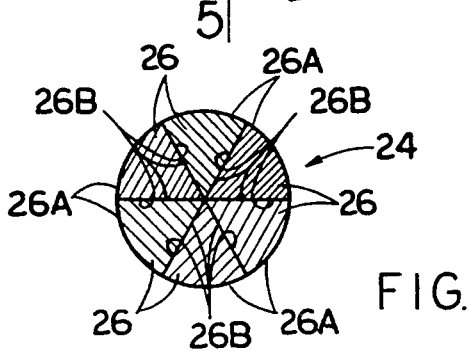
FIG. 6 is a cross-sectional view of another segmented coupling member being modified in configuration from that of the segmented coupling member of FIG. 5.

As illustrated in FIGS. 2 and 4-6, the segmented rod-shaped coupling member 24 has a cylindrical configuration. Other configurations, such as different polygonal shapes, are possible. Each longitudinal sections 26 of the segmented rod-shaped member 24 has a plurality of respective longitudinal surfaces 26A and 26B and a pair of opposite end surfaces 26C and 26D (sse FIG. 4). The longitudinal sections 26 are symmetrically arranged about the axis A. One preferred embodiment of the segmented coupling member 24, illustrated in FIGS. 2, 4 and 5, is made up of four identical longitudinal sections 26 with each having approximately one-fourth of the cylindrical configuration of the coupling member 24. Another preferred embodiment of the segmented coupling member 24, illustrated in FIG. 6, is made up of six identical longitudinal sections 26 with each having approximately one-sixth of the cylindrical configuration of the coupling member 24. Still another preferred embodiment of the segmented coupling member 24, not shown, is made up of five identical longitudinal sections 26 with each having approximately one-fifth of the cylindrical configuration of the coupling member 24. As seen in FIGS. 5 and 6, the longitudinal sections 26 are capable of being assembled together with one another in a nested relationship to form the coupling member 24.

Referring to FIGS. 1-3, in an exemplary embodiment the retaining means 28 of the coupling assembly 12 is a hollow sleeve-shaped member capable of receiving and retaining the longitudinal sections 26 in the assembled, nested relationship with one another and receiving and retaining the leading ends 16A of the light conductors 16 in contact with the end surfaces 26D defining the opposite end face 24B of the coupling member 24. A suitable retaining member 28 which can be employed in the optical coupling assembly 12 is the one disclosed in the first patent application cross-referenced above, the disclosure of which is incorporated herein by reference thereto. Alternatively, the assembled longitudinal sections 26 can be adhered to one another and retained in the nested relationship with one another by the application of a suitable adhesive between the adjacent external sides thereof.

In such nested relationship, the longitudinal sections 26 extend generally parallel to the central longitudinal axis A and to one another. Further, the curved longitudinal surfaces 26A at the outer periphery of the longitudinal sections 26 together define an external cylindrical circumferential surface of the coupling member 24. The planar longitudinal surfaces 26B at the opposite sides of the longitudinal sections 26 together define a plurality of adjacent pairs of internal surfaces within the coupling member 24 which extend from the external cylindrical circumferential surface to the central longitudinal axis A of the coupling member 24. The opposite end surfaces 26C and 26D of the assembled longitudinal sections 26 together define flat circular opposite end surfaces on the coupling member 24 which extend generally perpendicular to the central longitudinal axis A thereof. The outer and side longitudinal surfaces 26A, 26B bounding each quadrant of the coupling member 24 defined by the respective longitudinal sections 26 act as light reflective surfaces such that the image of the non-coherent high brightness focussed light output L received by the coupling member 24 is divided into four portions which are transmitted independently of one another through the four quadrants of the coupling member 24 by internal reflections. It is readily apparent that the number of internal reflections per unit length are thereby substantially increased over that in the case of an unsegmented coupling member. The increased number of internal reflections causes increased mixing of the outer and central portions of the light so as to substantially reduce the color differences to a point where they are not noticeable at the output end 12B of the coupling assembly 12.

Referring to FIGS. 7-11, there is illustrated another embodiment of an optical coupling assembly 30 of the present invention for coupling the light source 14 with a plurality of optical light conductors 32 being oval-shaped in cross-section. The main difference between this optical coupling assembly 30 and the above-described optical coupling assembly 12 resides in the configuration of the segmented coupling member 34 employed by this optical coupling assembly 30 which has been modified from the configuration of the segmented coupling member 24 of the optical coupling assembly 12. As seen in FIGS. 7 and 11, the segmented coupling member 34 has a plurality of longitudinal sections 36 which at a forward portion 34A of the coupling member 34 are substantially identical to the longitudinal sections 26 of the segmented coupling member 24 as illustrated in FIGS. 1 and 4 and described previously. However, the segmented coupling member 34 has a rearward portion 34B in which the longitudinal sections 36 diverge from their nested relationship with one another into a relationship in which the longitudinal sections 36 are spaced circumferentially from one another and radially from the central longitudinal axis A. The spaced longitudinal sections 36 at the rearward portion 34B of the coupling member 34 gradually change in cross-sectional shapes in a tapering fashion from the quadrant shapes, shown in FIG. 8, to generally round or oval shapes to conform to the shape of the leading ends 32A of the light conductor members 32, shown in FIG. 9, in which the end faces 36D of the longitudinal sections 36 are slightly smaller in size than the leading ends 32A of the light conductor members 32, as seen in FIG. 10. This embodiment of the segmented coupling member 34 retains the advantage of the increased number of internal reflections per unit length as before. Also, if the areas of the input and output end faces 34C, 34D of the coupling member 34 are about equal, the angular distribution of the light will not be changed significantly.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof.

We claim:

1. An optical lighting system comprising a lamp for generating a non-coherent light output, a reflector element having an ellipsoidal shape, a mirror element having a planar shape; said lamp, reflector element, and mirror element are arranged to direct an image of said non-coherent light output to an input end of an optical coupling assembly, said optical coupling assembly comprising:

(a) a light transmissive elongated rod-shaped coupling member having a central longitudinal axis and being disposed between said lamp and leading ends of a plurality of optical light conductors, said coupling member includes a plurality of longitudinal rod sections each having a plurality of longitudinal surfaces assembled together in a nested relationship to one another for internally reflecting travelling light within said sections, some of said longitudinal surfaces including means having straight edges for providing uniform light intensity distribution and mixing of light color of non-coherent light;

(b) a retaining sleeve member surrounding at least a portion of said rod sections so that said rod sections are assembled together with one another in the nested relationship so as to form said coupling member such that said longitudinal surfaces of said sections together define an external circumferential surface of said coupling member and a plurality of internal surfaces within said coupling member extend across said circumferential surface; and (c) wherein said respective longitudinal rod sections each have first and second longitudinal surfaces disposed in contacting relation to one another along a joined edge, said longitudinal rod sections further having a substantially uniform cross-sectional area along the respective lengths thereof so that, when nested together within said retaining sleeve member, said rod-shaped coupling member has a substantially uniform cross-sectional diameter along the length thereof.

2. The coupling assembly as recited in claim 1, wherein said coupling member has a cylindrical configuration.

3. The coupling assembly as recited in claim 1, wherein said longitudinal sections are substantially identical to one another and in said nested relationship are symmetrically arranged about said central longitudinal axis and extend generally parallel to said central longitudinal axis and to one another.

4. The coupling assembly as recited in claim 1, wherein said some of said longitudinal surfaces being located at outer peripheries of said longitudinal sections are of curved shapes so as to define said external circumferential surface of said coupling member having a cylindrical shape.

5. The coupling assembly as recited in claim 4, wherein said other of said longitudinal surfaces being located at opposite sides of said longitudinal sections are of planar shapes so as to define a plurality of adjacent pairs of internal surfaces within said coupling member which extend from said external circumferential surface to said central longitudinal axis of said coupling member.

* * * * *